US009223407B2

(12) United States Patent
Hsu et al.

(10) Patent No.: US 9,223,407 B2
(45) Date of Patent: Dec. 29, 2015

(54) GESTURE RECOGNITION APPARATUS AND COMPLEX OPTICAL APPARATUS

(71) Applicants: En-Feng Hsu, Hsin-Chu (TW); Ming-Tsan Kao, Hsin-Chu (TW); Yu-Hao Huang, Hsin-Chu (TW); Yi-Hsien Ko, Hsin-Chu (TW); Nien-Tse Chen, Hsin-Chu (TW)

(72) Inventors: En-Feng Hsu, Hsin-Chu (TW); Ming-Tsan Kao, Hsin-Chu (TW); Yu-Hao Huang, Hsin-Chu (TW); Yi-Hsien Ko, Hsin-Chu (TW); Nien-Tse Chen, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 39 days.

(21) Appl. No.: 14/072,328

(22) Filed: Nov. 5, 2013

(65) Prior Publication Data

US 2014/0139488 A1 May 22, 2014

(30) Foreign Application Priority Data

Nov. 16, 2012 (TW) ........................... 1011422727 A

(51) Int. Cl.
*G06F 3/01* (2006.01)

(52) U.S. Cl.
CPC ..................................... *G06F 3/017* (2013.01)

(58) Field of Classification Search
CPC .............. H04N 5/225; H04N 1/32144; H04N 1/00005; H04N 1/00037
See application file for complete search history.

(56) References Cited

U.S. PATENT DOCUMENTS

| | | | | |
|---|---|---|---|---|
| 8,537,339 | B2 | 9/2013 | Hsu et al. | |
| 8,666,115 | B2 | 3/2014 | Perski et al. | |
| 2012/0307123 | A1 * | 12/2012 | Cok et al. | 348/333.01 |
| 2012/0313867 | A1 * | 12/2012 | Luo et al. | 345/173 |

* cited by examiner

*Primary Examiner* — Michael Faragalla
(74) *Attorney, Agent, or Firm* — Tung & Associates

(57) ABSTRACT

The present invention discloses a gesture recognition apparatus including a substrate, a light emitting device, an image sensor and a processing unit. The light emitting device is for emitting a light beam according to a first clock signal. The image sensor is disposed on the substrate and is for receiving the light beam reflected by an object according to a second clock signal to generate an object image. The processing unit is disposed on the substrate and is for recognizing the object image detected by the image sensor to provide a command signal. There is a correlation between a period of the first clock signal and a period of the second clock signal. The present invention also provides a complex optical apparatus.

17 Claims, 4 Drawing Sheets

GESTURE RECOGNITION APPARATUS AND COMPLEX OPTICAL APPARATUS

CROSS REFERENCE

The present invention claims priority to TW 101142727, filed on Nov. 16, 2012.

BACKGROUND OF THE INVENTION

1. Field of Invention

The present invention relates to a gesture recognition apparatus and a complex optical apparatus.

2. Description of Related Art

Currently, for a user to select a function such as a phone number or a software application program on a smart phone, a handheld device or a display device, the user usually either directly touches the target icon displayed on the touch screen or selects it with an input device.

For example, keyboards, mouses or touch panels are typical tools for such selections in desktop PCs or tablet PCs. Alternatively, a user may perform selections in a non-contact manner through a proximity sensor. For example, when a user holds his mobile phone near to his head, the mobile phone will turn off its screen. In current state of the art, the proximity sensing device, the ambient light sensing device and the gesture recognition device are respectively assembled as individual modules and then combined into an electronic device (e.g., a mobile phone), if it is desired for the electronic device to include all these functions. Hence, the size of the electronic device can not be effectively reduced.

SUMMARY OF THE INVENTION

The present invention provides a gesture recognition apparatus which reduces the processing time of an external processor and reduces the required conversion of the input/output signals (IO signals), thus saving the power consumption.

The present invention also provides a complex optical apparatus which integrates multiple optical sensing devices into one module so that the complex optical apparatus not only possesses a complex optical sensing capability but also has a small size.

Other objectives and advantages of the present invention can be understood from the disclosure of the specification.

To achieve one or more of the above and other objectives, from one perspective, the present invention provides a gesture recognition apparatus comprising a substrate, a light emitting device, an image sensor and a processing unit. The light emitting device is for emitting a light beam according to a first clock signal; the image sensor is disposed on the substrate and is for receiving the light beam reflected by an object movement according to a second clock signal to generate an object image; and the processing unit is disposed on the substrate and is for recognizing the object image detected by the image sensor to provide a command signal, wherein there is a correlation between a period of the first clock signal and a period of the second clock signal.

In one embodiment, the image sensor is capable of providing a synchronous signal to establish the correlation between the period of the first clock signal and the period of the second clock signal.

In one embodiment, the light emitting device is disposed on the substrate.

In one embodiment, the first clock signal and the second clock signal have the same period. In another embodiment, the second clock signal has a frequency which is a multiple of a frequency of the first clock signal.

From another perspective, the present invention provides a complex optical apparatus comprising a light emitting device, an image sensor, an optical sensor and a processing unit. The light emitting device is for emitting an invisible light beam; the image sensor is for receiving the invisible light beam reflected by a moving or nearby object to generate a first image signal; the optical sensor is for detecting a visible light beam to provide a second image signal; and the processing unit is for processing the first image signal or the second image signal to output a first command signal or a second command signal.

In one embodiment, the first command signal includes a gesture command signal or a proximity sensing signal.

In one embodiment, the second command signal includes an ambient light sensing signal.

In one embodiment, at least two of the followings are disposed on a same substrate: the light emitting device, the image sensor, the optical sensor and the processing unit.

In one embodiment, the image sensor is capable of providing a synchronous signal to establish a correlation between a period of a clock signal of the image sensor for exposure and a period of a clock signal of the light emitting device for emitting the invisible light beam.

From yet another perspective, the present invention provides a complex optical apparatus comprising a light emitting device, an invisible light sensor, an image sensor and a processing unit. The light emitting device is for emitting an invisible light beam; the invisible light sensor is for receiving the invisible light beam reflected by a nearby object to generate a first image signal; the image sensor is for receiving the invisible light beam reflected by a movement of an object to generate a second image signal; and the processing unit is for processing the first image signal or the second image signal to output a first command signal or a second command signal.

In one embodiment, the processing unit is capable of providing a trigger signal according to the first command signal to trigger a clock signal of the image sensor for exposure.

In one embodiment, there is a correlation between a period of a clock signal of the image sensor for exposure and a period of a clock signal of the light emitting device for emitting the invisible light beam.

In one embodiment, the first command signal includes a proximity sensing signal.

In one embodiment, the second command signal includes a gesture command signal.

In one embodiment, the complex optical apparatus further comprises a visible light sensor for detecting a visible light beam to generate a third image signal. In one embodiment, the processing unit is capable of processing the third image signal to output a third command signal. In one embodiment, the third command signal includes an ambient light sensing signal.

In one embodiment, at least two of the followings are disposed on a same substrate: the light emitting device, the image sensor, the invisible light sensor and the processing unit.

In view of the above, the present invention has at least the following features and advantages: Because at least two of the devices of the gesture recognition apparatus or the complex optical apparatus are integrated into a same module, the present invention can directly output the corresponding commands, so that the processing time of an external processor and the required conversion of the input/output signal (IO signal) are reduced, thus saving the power consumption. In addition, the present invention can achieve complex optical sensing functions with effectively reduced volume and size.

The objectives, technical details, features, and effects of the present invention will be better understood with regard to the detailed description of the embodiments below, with reference to the attached drawings.

DESCRIPTION OF THE PREFERRED EMBODIMENTS

Figure 1A:
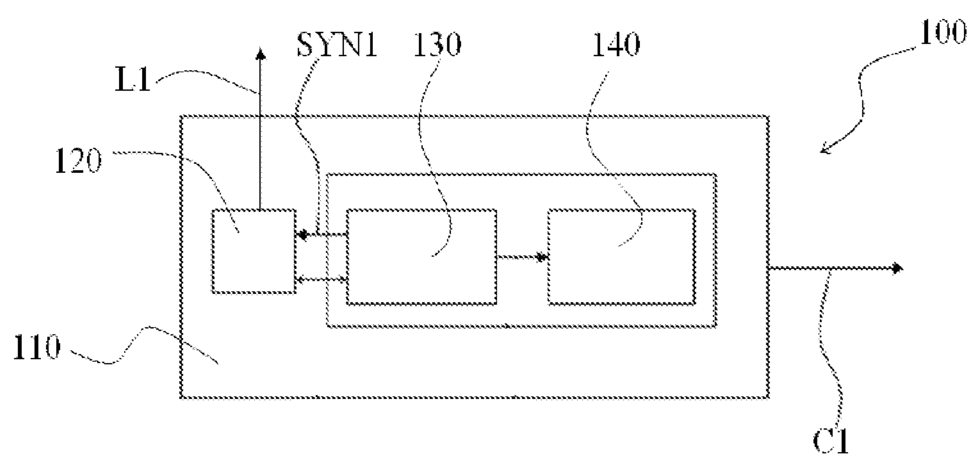
FIG. 1A shows a schematic diagram of a gesture recognition apparatus according to an embodiment of the present invention.

The above and other technical details, features and effects of the present invention will be will be better understood with regard to the detailed description of the embodiments below, with reference to the drawings. In the description, the words relate to directions such as “on”, “below”, “left”, “right”, “forward”, “backward”, etc. are used to illustrate relative orientations in the drawings and should not be considered as limiting in any way.

Figure 1B:
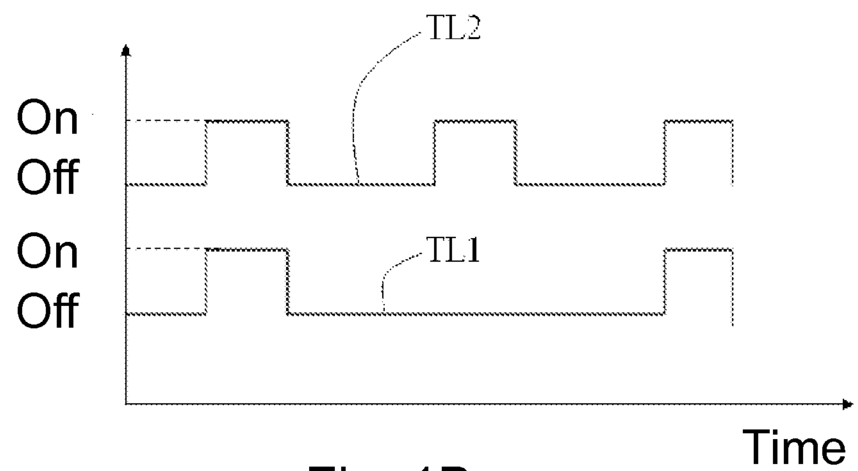
FIG. 1B shows a schematic diagram of the clock signals which control the image sensor and the light emitting device of the FIG. 1A, respectively.

FIG. 1A shows a schematic diagram of a gesture recognition apparatus according to an embodiment of the present invention. FIG. 1B shows a schematic diagram of two clock signals which control the image sensor and the light emitting device of the FIG. 1A, respectively. Please refer to FIG. 1A. The gesture recognition apparatus 100 of this embodiment comprises a substrate 110, a light emitting device 120, an image sensor 130 and a processing unit 140. The light emitting device 120 is for example disposed on the substrate 100 and it can emit a light beam L1 according to a first clock signal TL1. In this embodiment, the light emitting device 120 can be a light emitting diode; and preferably, in order for better sensing effect and faster response by the gesture recognition apparatus 100, the light emitting device 120 can be a light emitting diode which emits invisible light. The light beam L1 can be an infrared light beam or an ultraviolet light beam. This embodiment takes the infrared light beam as an example of the light beam L1, but this is for illustrative purpose, not for limiting the scope of the present invention. The type of the light beam L1 can be determined depending on user’s practical needs. The substrate 110 can be a normal hard circuit board, a soft circuit board or a wire frame. The light emitting device 120 can be attached to the substrate 110 by surface mounting technology (SMT), wire bonding, or any other suitable ways.

Still referring to FIG. 1A, the image sensor 130 is disposed on the substrate 110 and is for receiving the light beam L1 of the light emitting device 120 reflected by an object (e.g., a hand or a part of a hand) according to a second clock signal TL2 to generate an object image. The type of the image sensor 130 can be determined according to the wavelength range of the light emitted by the light emitting device 120. For one example, if the light emitting device 120 is an infrared light emitting diode, the image sensor 130 is preferably an infrared image sensor. For another example, if the light emitting device 120 emits visible light beam, the image sensor 130 is preferably an image sensor capable of sensing visible light. The image sensor 130 for example can be a CMOS image sensor or a CCD image sensor. This embodiment takes the CMOS image sensor as an example of the image sensor 130.

It is noteworthy that there is a correlation between the period of the first clock signal TL1 and the period of the second clock signal TL2, as shown in FIG. 1B. For example, the frequency of the second clock signal TL2 is a multiple of the frequency the first clock signal TL1. In other words, for a more specific example, while the light emitting device 120 is turned on to emit light once per unit time, the exposure time of the image sensor 130 is twice per unit time. Thus, the image sensor 130 can capture one image with light and another image without light at different time points. By processing the image with light and the image without light, the background noises can be better removed by the processing unit 140 for better gesture recognition. In another embodiment, the first clock signal TL1 and the second clock signal TL2 can have the same period. In other words, the image sensor 130 only captures the image with light and the processing unit 140 only processes the image with light to obtain the gesture recognition information preferably, the image sensor 130 is capable of providing a synchronous signal SYN1 to the light emitting device 120 to synchronize the first clock signal TL1 and the second clock signal TL2, so that the light emitting device 120 is not turned on unnecessarily and the image sensor 130 can capture the image with light more accurately.

Please still refer to FIG. 1A. The processing unit 140 is disposed on the substrate 110 and is for recognizing the object image detected by the image sensor 130 to provide a command signal C1. For a more specific example, the processing unit 140 can be a digital signal processor (DSP). The processing unit 140 can receive and process the object image detected by the image sensor 130 to obtain information relating to a movement of the object (e.g., an upward gesture, a downward gesture, a leftward gesture, a rightward gesture, a forward gesture, a backward gesture, or a rotation gesture, etc.), and output the corresponding command signal C1 to an electronic device (not shown) to control its operation.

It should be noted that because the image sensor 130 and the processing unit 140 are integrated into a same module (e.g., both of them are disposed on the above-mentioned substrate 110), the present invention can directly output the command signal C1 corresponding to the gesture, so that the processing time of the external processor is reduced and the required conversion of the input/output signals (IO signals) is reduced, thus saving the power consumption. For example, if the image transmitted by the image sensor 130 is a VGA image (e.g., 640×480 bytes), the outputted data amount in a conventional device is 640×480 bytes. However, the processing unit 140 of this embodiment can process the image and directly output the command signal C1, wherein the data amount of the command signal C1 is only 1 byte. Thus, in this example, the present invention can reduce not only the power consumption of the input/output by 300,000 times but also the number of the input/output devices, which effectively reduces the volume and the size of the module.

Figure 2:
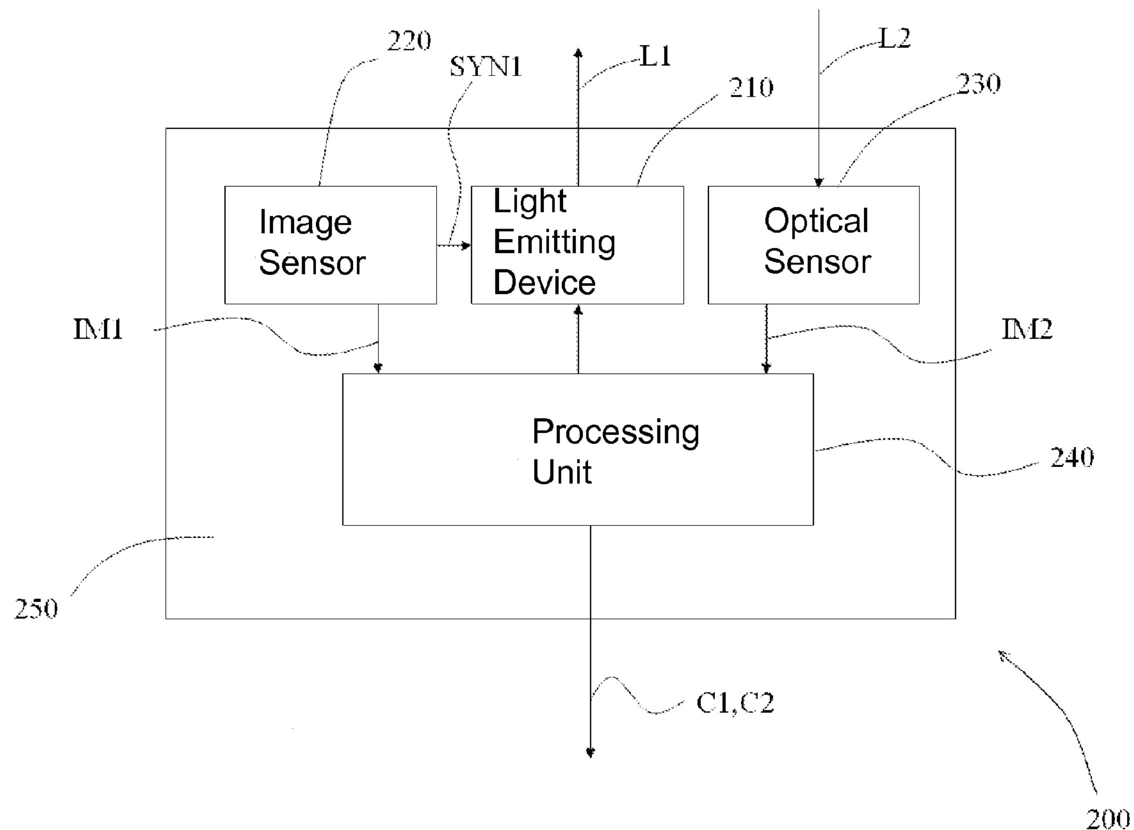
FIG. 2 shows a schematic diagram of a complex optical apparatus according to another embodiment of the present invention.

FIG. 2 shows a schematic diagram of a complex optical apparatus according to another embodiment of the present invention. The complex optical apparatus 200 comprises alight emitting device 210, an image sensor 220, an optical sensor 230 and a processing unit 240. In this embodiment, the light emitting device 210 can be, for example, the above-mentioned light emitting device 120 capable of emitting an invisible light beam L1. In addition, in order to detect the invisible light beam L1 reflected by an object (e.g., a hand or a part of a hand), the image sensor 220 can be an image sensor capable of sensing invisible light. That is, the image sensor 220 of this embodiment is capable of receiving the invisible light beam L1 reflected by an object which is nearby or moving to generate a first image signal IM1.

More specifically, the image sensor 220 can be used to determine a gesture (object movement) formed by sequential object images or can be adopted as a proximity sensor. When an object (e.g., a user's hand or face, or any object that is moved by a part of a human body) gradually approaches toward the complex optical apparatus 200, the object image detected by the image sensor 220 will gradually become brighter and larger. Thus, the proximity status of the object can be determined, i.e., the complex optical apparatus 200 can function as a proximity sensor by means of the image sensor 220 (without requiring an additional proximity sensor). In another embodiment, when the complex optical apparatus 200 detects that an object is approaching, the image sensor 220 can switch to the above-mentioned gesture detection mode. That is, the image captured by the image sensor 220 can be used by the processing unit 240 to determine the gesture and output a first command signal C1. In this embodiment, the first command signal C1 can be a gesture command signal or a proximity sensing signal depending on the operation mode of the complex optical apparatus 200 (e.g., gesture detection mode or proximity sensing mode) and the judgment by the processing unit 240.

Please still refer to FIG. 2. The optical sensor 230 of this embodiment is for detecting a visible light beam L2 to provide a second image signal IM2. More specifically, the optical sensor 230 for example can be an ambient light sensor having one single pixel or plural pixels. When the ambient light is changed (e.g., become darker or brighter), the optical sensor 230 can detect the intensity of the ambient light to generate the second image signal IM2 which is sent to the processing unit 240. The processing unit 240 processes the second image signal IM2 to generate a second command signal C2. In other words, the second command signal C2 is, for example, an ambient light sensing signal.

Moreover, the processing unit 240 can be, for example, the above-mentioned processing unit 140 (they can be two separated units or one same unit). That is, the processing unit 240 can receive and process the above-mentioned first image signal IM1 and the second image signal IM2, and output the above-mentioned first command signal C1 and second command signal C2 respectively, to an electronic device (not shown) to control its operation.

In this embodiment, at least two of the light emitting device 210, the image sensor 220, the optical sensor 230 and the processing unit 240 are disposed on a same substrate 250. If the image sensor 220, optical sensor 230 and processing unit 240 are integrated into one same module (e.g., when at least two of them are disposed on the same substrate 250), the present invention can directly output the command signal C1 corresponding to the gesture or the command signal C2 corresponding to the proximity sensing, then the processing time of the external processor is reduced and the required conversion of the input/output signals (IO signals) is reduced, thus saving the power consumption. For example, if the image transmitted by the image sensor 220 is a VGA image (e.g., 640×480 bytes), the outputted data amount of a conventional device is 640×480 bytes. However, the processing unit 240 of this embodiment can directly process the image and then output the command signal C1 or C2, wherein the data amount of the command signal C1 or C2 is only 1 byte. Thus, in this example, the present invention can reduce not only the power consumption of the input/output by 300,000 times but also the number of the input/output devices, which effectively reduces the volume and the size of the module.

Preferably, the image sensor 220 of this embodiment is capable of providing a synchronous signal SYN1 to the light emitting device 210, so that the light emitting device 210 is not turned on unnecessarily and the image sensor 220 can capture the image with light more accurately.

Figure 3:
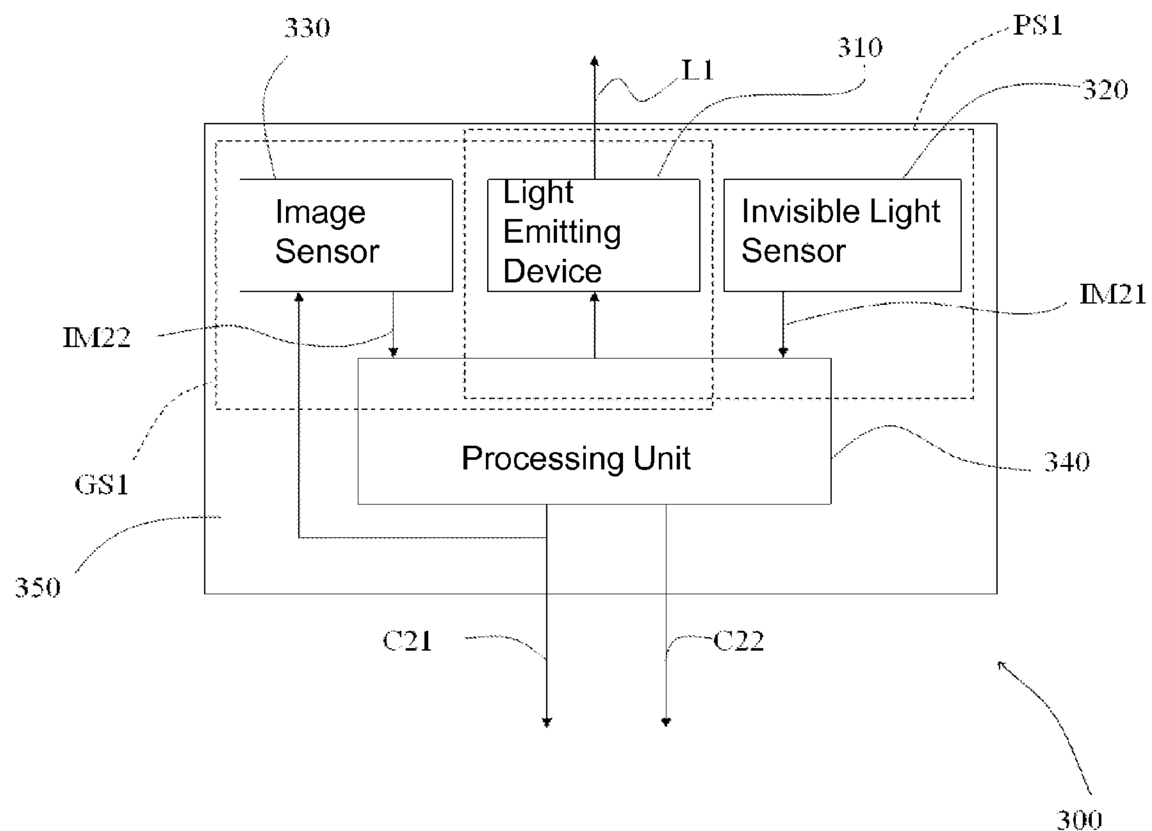
FIG. 3 shows a schematic diagram of a complex optical apparatus according to yet another embodiment of the present invention.

FIG. 3 shows a schematic diagram of a complex optical apparatus according to yet another embodiment of the present invention. Please refer to FIG. 3. The complex optical apparatus 300 of this embodiment is substantially the same as the above-mentioned complex optical apparatus 200, but is different in that the complex optical apparatus 300 of this embodiment employs two different types of sensors to judge the gesture or perform proximity sensing. The complex optical apparatus 300 of this embodiment comprises a light emitting device 310, an invisible light sensor 320, an image sensor 330 and a processing unit 340. The light emitting device 310 can be, for example, the above-mentioned light emitting device 120 or 210, which is not redundantly explained here. The invisible light sensor 320 is for receiving the invisible light beam L1 emitted from the light emitting device 310 and reflected by a nearby object (e.g., a hand or a part of a hand) to generate a first image signal IM21. The processing unit 340 will then process the first image signal IM21 and determine whether an object is nearby to output a first command signal C21. That is, in the complex optical apparatus 300, the light emitting device 310 and the invisible light sensor 320 form a proximity sensing unit PS1 to determine whether an object is nearby.

Furthermore, the image sensor 330 can be, for example, the above-mentioned image sensor 130. Hence, the image sensor 330 is capable of receiving the invisible light beam L1 emitted from the light emitting device 310 and reflected by a movement of an object to generate a second image signal IM22. The processing unit 340 will then process the second image signal IM22 to determine whether an object is performing a gesture trajectory, and output a second command signal C22. That is, in the complex optical apparatus 300, the light emitting device 310 and the image sensor 330 can form a gesture sensing unit GS1 to determine a gesture formed by the motion trajectory of an object. In this embodiment, the processing unit 340 can be, for example, the processing unit 140 or 240, which is not redundantly explained here. Preferably, the processing unit 340 can provide a trigger signal according to the first command signal C21, to trigger an exposure clock signal of the image sensor 330. In brief, in order to save the power consumption of the complex optical apparatus 300, the light emitting device 310 and the invisible light sensor 320 are used to detect whether there is an object approaching, and the processing unit 340 will trigger the image sensor 330 to perform the gesture detection when it is confirmed that there is an object nearby. Note that the proximity sensing unit PS1 and the gesture sensing unit GS1 can share a common light emitting device 310.

Similar to the previous embodiment, there is preferably a correlation between the clock signal of the image sensor 330 for exposure and the clock signal of the light emitting device 310 for emitting light, to provide the advantages described with respect to the previous embodiment. Also similar to the previous embodiment, in the complex optical apparatus 300, at least two of the light emitting device 310, the image sensor 330, the invisible light sensor 320 and the processing unit 340 are preferably disposed on the same substrate 350 to form one module, so that by similar reasons as explained in the above, the power consumption, the number of the input/output devices, and the volume and size of the module can be effectively reduced.

Figure 4:
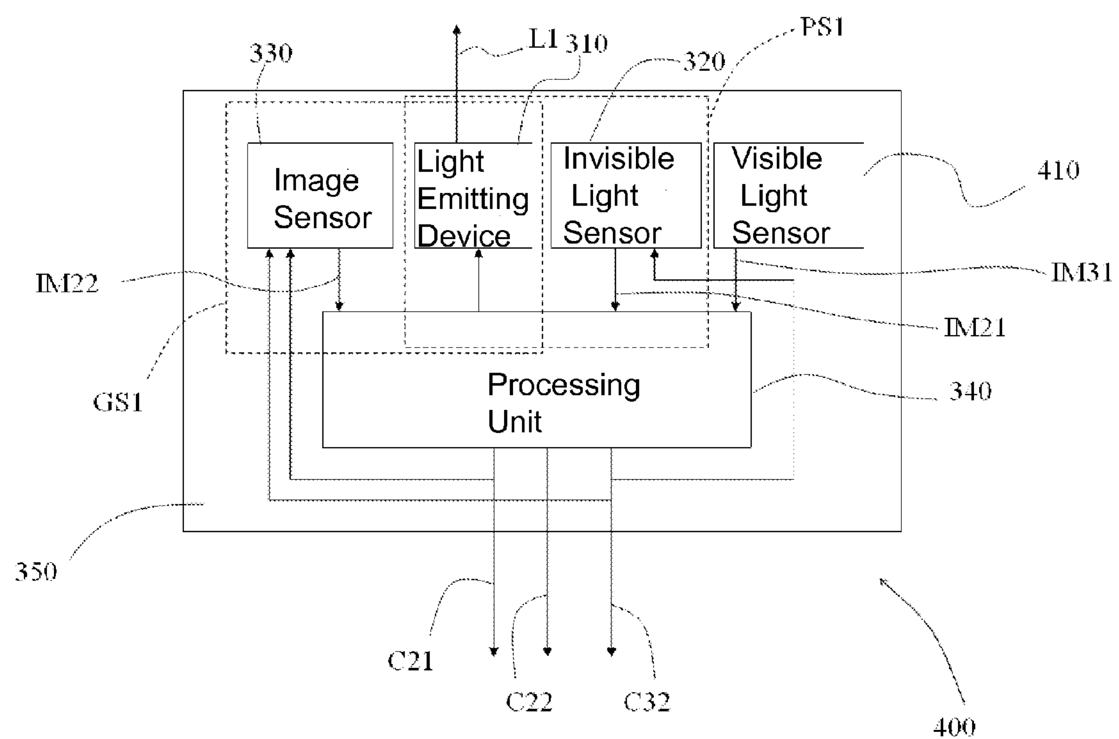
FIG. 4 shows a schematic diagram of a complex optical apparatus according to still another embodiment of the present invention.

FIG. 4 shows a schematic diagram of a complex optical apparatus according to still another embodiment of the present invention. Please refer to both FIG. 3 and FIG. 4. The complex optical apparatus 400 of this embodiment is substantially the same as the above-mentioned complex optical apparatus 300, but is different in that the complex optical apparatus 400 of this embodiment further comprises a visible light sensor 410. The visible light sensor 410 is for detecting a visible light beam to generate a third image signal IM31. The processing unit 340 is capable of processing the third image signal IM31 to output a third command signal C32. In this embodiment, the visible light sensor 410 can be, for example, the above-mentioned optical sensor 230, and the third command signal C32 is the ambient light sensing signal as described above. The details of the ambient light sensing have been described in the above and are therefore not redundantly repeated here. In a preferred embodiment, the processing unit 340 can adjust the image sensor 330, the invisible light sensor 320, and/or the light emitting device 310. For example, if the visible light sensor 410 is for sensing the ambient light and it is found that the ambient light becomes darker, the intensity of the light emitted from the light emitting device 310 can be reduced to save power consumption, or the frame rate of the image sensor 330 and/or the invisible light sensor 320 can be reduced to increase the processing speed of the processing unit 340.

Note that the optical sensor and/or the image sensor can include (or integrated with) a digital signal processor (DSP) to generate a processed signal, and send the processed signal to the above-mentioned processing unit. The processed signal generated by the optical sensor and/or the image sensor can be the above-mentioned image signal or command signal. The processing unit can be a micro computing unit (MCU) or a digital signal processor (DSP). Certainly, it should be understood that these examples are for illustrative purpose, but not for limiting the scope of the present invention.

In view of the above, the present invention has at least the following features and advantages: Because at least two of the devices of the gesture recognition apparatus or the complex optical apparatus are integrated into a same module, the present invention can directly output the corresponding commands, so that the processing time of an external processor and the required conversion of the input/output signal (IO signal) are reduced, thus saving the power consumption. In addition, the present invention can achieve complex optical sensing functions with effectively reduced volume and size.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A gesture recognition apparatus, comprising:

a substrate;

a light emitting device for emitting a light beam according to a first clock signal;

an image sensor for receiving the light beam reflected by a movement of an object according to a second clock signal to generate an object image; and a processing unit for recognizing the object image detected by the image sensor to provide a command signal;

wherein the image sensor and the processing unit are disposed on a same substrate and integrated into a same module, whereby the module directly outputs the command signal without outputting the object image, and a data amount of the command signal outputted from the processing unit is smaller than a data amount of the object image; and wherein there is a correlation between a period of the first clock signal and a period of the second clock signal.

2. The gesture recognition apparatus of claim 1, wherein the image sensor provides a synchronous signal to establish the correlation between the period of the first clock signal and the period of the second clock signal.

3. The gesture recognition apparatus of claim 1, wherein the light emitting device is disposed on the substrate.

4. The gesture recognition apparatus of claim 1, wherein the first clock signal and the second clock signal have the same period.

5. The gesture recognition apparatus of claim 1, wherein the second clock signal has a frequency which is a multiple of a frequency of the first clock signal.

6. A complex optical apparatus, comprising:

a light emitting device for emitting an invisible light beam;

an image sensor for receiving the invisible light beam reflected by a moving or nearby object to generate a first image signal;

an optical sensor for detecting a visible light beam to provide a second image signal; and a processing unit for processing the first image signal or the second image signal to output a first command signal or a second command signal;

wherein the image sensor, the optical sensor and the processing unit are disposed on a same substrate and integrated into a same module, whereby the module directly outputs the first or second command signal without outputting the object image, and a data amount of the first command signal outputted from the processing unit is smaller than a data amount of the first image signal and a data amount of the second command signal outputted from the processing unit is smaller than a data amount of the second image signal.

7. The complex optical apparatus of claim 6, wherein the first command signal includes a gesture command signal or a proximity sensing signal.

8. The complex optical apparatus of claim 6, wherein the second command signal includes an ambient light sensing signal.

9. The complex optical apparatus of claim 6, wherein the image sensor provides a synchronous signal to establish a correlation between a period of a clock signal of the image sensor for exposure and a period of a clock signal of the light emitting device for emitting the invisible light beam.

10. A complex optical apparatus, comprising:

a light emitting device for emitting an invisible light beam;

an invisible light sensor for receiving the invisible light beam reflected by a nearby object to generate a first image signal;

an image sensor for receiving the invisible light beam reflected by a movement of the object to generate a second image signal; and a processing unit for processing the first image signal or the second image signal to output a first command signal or a second command signal;

wherein the image sensor, the invisible light sensor and the processing unit are disposed on a same substrate and integrated into a same module, whereby the module directly outputs the first or second command signal without outputting the object image, and a data amount of the first command signal outputted from the processing unit is smaller than a data amount of the first image signal and a data amount of the second command signal outputted from the processing unit is smaller than a data amount of the second image signal.

11. The complex optical apparatus of claim 10, wherein the processing unit provides a trigger signal according to the first command signal to trigger a clock signal of the image sensor for exposure.

12. The complex optical apparatus of claim 10, wherein there is a correlation between a period of a clock signal of the image sensor for exposure and a period of a clock signal of the light emitting device for emitting the invisible light beam.

13. The complex optical apparatus of claim 10, wherein the first command signal includes a proximity sensing signal.

14. The complex optical apparatus of claim 10, wherein the second command signal includes a gesture command signal.

15. The complex optical apparatus of claim 10, further comprising:

a visible light sensor for detecting a visible light beam to generate a third image signal.

16. The complex optical apparatus of claim 15, wherein the processing unit further processes the third image signal to output a third command signal.

17. The complex optical apparatus of claim 16, wherein the third command signal includes an ambient light sensing signal.

* * * * *